(12) United States Patent
Ikegami

(10) Patent No.: US 8,645,815 B2
(45) Date of Patent: Feb. 4, 2014

(54) GUI EVALUATION SYSTEM, GUI EVALUATION METHOD, AND GUI EVALUATION PROGRAM

(75) Inventor: Teruya Ikegami, Tokyo (JP)

(73) Assignee: NEC Corporation, Tokyo (JP)

(*) Notice: Subject to any disclaimer, the term of this patent is extended or adjusted under 35 U.S.C. 154(b) by 355 days.

(21) Appl. No.: 13/063,125

(22) PCT Filed: Aug. 7, 2009

(86) PCT No.: PCT/JP2009/003828
§ 371 (c)(1),
(2), (4) Date: Mar. 9, 2011

(87) PCT Pub. No.: WO2010/035390
PCT Pub. Date: Apr. 1, 2010

(65) Prior Publication Data
US 2011/0167303 A1    Jul. 7, 2011

(30) Foreign Application Priority Data

Sep. 29, 2008 (JP) ................. 2008-251810

(51) Int. Cl.
*G06F 17/00* (2006.01)

(52) U.S. Cl.
USPC ........... 715/227; 715/230; 715/256; 715/236; 715/204; 714/38.1

(58) Field of Classification Search
USPC .............. 715/227, 230, 256, 236.204, 243; 714/38, 1, E11.207
See application file for complete search history.

(56) References Cited

U.S. PATENT DOCUMENTS

| | | | |
|---|---|---|---|
| 5,542,085 A * | 7/1996 | Kanzaki et al. ................. 1/1 |
| 6,580,440 B1 * | 6/2003 | Wagner et al. ............. 715/762 |
| 7,610,309 B2 * | 10/2009 | Burger et al. ..................... 1/1 |
| 2006/0178791 A1 * | 8/2006 | Fountain et al. .............. 701/31 |
| 2006/0288259 A1 * | 12/2006 | Battenfelder et al. ......... 714/47 |

(Continued)

FOREIGN PATENT DOCUMENTS

| | | |
|---|---|---|
| JP | 8-241191 A | 9/1996 |
| JP | 11-85497 A | 3/1999 |

(Continued)

OTHER PUBLICATIONS

International Search Report for PCT/JP2009/003828 mailed Oct. 20, 2009.

(Continued)

*Primary Examiner* — Tadeese Hailu
(74) *Attorney, Agent, or Firm* — Sughrue Mion, PLLC

(57) ABSTRACT

The consistency of the heading expressions used in each screen in a plurality of evaluated screens is exhaustively and reliably evaluated. The GUI evaluation system comprises: GUI information storage means for storing GUI information that concerns heading included in an evaluation target screen and includes information indicative of heading expression which is the expression used for the heading; heading group specification means for grouping headings included in each evaluation target screen by expression used for the headings in accordance with the GUI information stored in the GUI information storage means; and heading expression evaluation means for evaluating a consistency of heading expressions between a plurality of evaluation target screens by comparing heading groups that are grouped by the heading group specification means and included in all possible combinations of two of the plurality of evaluation target screens.

15 Claims, 12 Drawing Sheets

(56) References Cited

U.S. PATENT DOCUMENTS

| | | | | |
|---|---|---|---|---|
| 2008/0079693 | A1* | 4/2008 | Okamoto et al. | 345/157 |
| 2009/0138307 | A1* | 5/2009 | Belcsak et al. | 705/7 |
| 2009/0217302 | A1* | 8/2009 | Grechanik et al. | 719/320 |
| 2011/0289398 | A1* | 11/2011 | Chin | 715/227 |

FOREIGN PATENT DOCUMENTS

| | | |
|---|---|---|
| JP | 2004110267 A | 4/2004 |
| JP | 2004234402 A | 8/2004 |
| JP | 2004355157 A | 12/2004 |

OTHER PUBLICATIONS

H. Okada et al., "GUI-tester II: a Tool for Computer-Aided GUI Design Consistency Evaluation", IPSJ SIG Notes, vol. 97, No. 63, Jul. 1997, pp. 7-12.

A. Hashimoto et al., "An Automatic Evaluation System for GUI Usability Using Extended Statechart ", IPSJ SIG Notes, vol. 2002, No. 91, Sep. 21, 2002, pp. 91-98.

* cited by examiner

FIG. 4

```
WINDOW A
■ HEADING 1
                              A1       A2
HEADING 2
  ITEM 1: [_____]
  ITEM 2: [_____]  [ REF. ]
  ┌─ HEADING 3 ─┐   ┌─ HEADING 4 ─┐
  │ ● ITEM 3-1  │   │ ● ITEM 4-1  │
  │ ○ ITEM 3-2  │   │ ○ ITEM 4-2  │
  └─────────────┘   └─────────────┘
         A3              A4
HEADING 5                          A5
  ITEM 5: [_____]
                                   A6
  ┌─ HEADING 6 ─────────────────┐
  │ ● ITEM 6-1                  │
  │ ○ ITEM 6-2                  │
  └─────────────────────────────┘
                    [  OK  ] [ CANCEL ]
```

FIG. 5

| SCREEN NAME | HEADING NAME | INITIAL EXPRESSION | TEXT COLOR | BACKGROUND COLOR | FONT | LINE | COORDINATES (x,y) |
|---|---|---|---|---|---|---|---|
| WINDOW A | A1 | ■ | #000000 | #EEEEEE | GOTHIC, 10pt, BOLD | - | (5,5) |
| | A2 | - | #000000 | #FFFFFF | GOTHIC, 9pt | UNDERLINE, #000000 | (15,30) |
| | A3 | - | #0000FF | #FFFFFF | GOTHIC, 9pt | FRAME, #EEEEEE | (25,80) |
| | A4 | - | #0000FF | #FFFFFF | GOTHIC, 9pt | FRAME, #EEEEEE | (100,80) |
| | A5 | - | #000000 | #FFFFFF | GOTHIC, 9pt | UNDERLINE, #000000 | (15,120) |
| | A6 | - | #0000FF | #FFFFFF | GOTHIC, 9pt | FRAME, #EEEEEE | (25,150) |

FIG. 6

| SCREEN NAME | HEADING NAME GROUP NAME | HEADING | INITIAL EXPRESSION | TEXT COLOR | BACK-GROUND COLOR | FONT | LINE | INDENT |
|---|---|---|---|---|---|---|---|---|
| WINDOW A | AG1 | A1, | ■ | #000000 | #EEEEEE | GOTHIC, 10pt, BOLD | - | - |
| | AG2 | A2, A5 | - | #000000 | #FFFFFF | GOTHIC, 9pt | UNDERLINE, #000000 | 10 |
| | AG3 | A3, A4, A6 | - | #0000FF | #FFFFFF | GOTHIC, 9pt | FRAME, #EEEEEE | 10 |

FIG. 9

WINDOW B

■ HEADING 1  ⎫ B1

HEADING 2  ⎫ B2

ITEM 1: [        ]   ITEM 2: [        ]

■ HEADING 3  ⎫ B3

ITEM 3: [        ]

ITEM 4: [                        ]

[ OK ]  [ CANCEL ]

FIG. 10

WINDOW C

■ HEADING 1  ⎫ C1

ITEM 1: [        ]   ITEM 2: [        ]

ITEM 3: [                        ]

■ HEADING 2  ⎫ C2

ITEM 4: [        ]

[ OK ]  [ CANCEL ]

FIG. 11

| EVALUATED SCREEN | JUDGMENT | COMMON ELEMENT | UNCOMMON ELEMENT |
|---|---|---|---|
| OVERALL | | | |
| WINDOW A - WINDOW B | ○:NO PROBLEM | AG1=BG1, AG2=BG2 | (AG3) |
| WINDOW A - WINDOW C | ○:NO PROBLEM | AG1=CG1 | (AG2, AG3) |
| WINDOW B - WINDOW C | ○:NO PROBLEM | BG1=CG1 | (BG2) |

FIG. 13

| EVALUATED SCREEN | JUDGMENT | COMMON ELEMENT | UNCOMMON ELEMENT |
|---|---|---|---|
| OVERALL | ×:PROBLEM | | |
| WINDOW A - WINDOW B | ○:NO PROBLEM | AG1=BG1, AG2=BG2 | (AG3) |
| WINDOW A - WINDOW C | ○:NO PROBLEM | AG1=CG1 | (AG2, AG3) |
| WINDOW A - WINDOW D | ○:NO PROBLEM | AG3=DG1 | (AG1, AG2) |
| WINDOW B - WINDOW C | ○:NO PROBLEM | BG1=CG1 | (BG2) |
| WINDOW B - WINDOW D | ×:PROBLEM | - | DG1≠(BG1, BG2) |
| WINDOW C - WINDOW D | ×:PROBLEM | - | DG1≠CG1 |

GUI EVALUATION SYSTEM, GUI EVALUATION METHOD, AND GUI EVALUATION PROGRAM

This application is the National Phase of PCT/JP2009/003828, filed Aug. 7, 2009, which is based upon and claims the benefit of priority from Japanese patent application No. 2008-251810, filed on Sep. 29, 2008, the disclosure of which is incorporated herein in its entirety by reference.

TECHNICAL FIELD

The present invention relates to a GUI evaluation system, GUI evaluation method, and GUI evaluation program for evaluating the usability of a system, and more particularly to, a GUI evaluation system, GUI evaluation method, and GUI evaluation program for evaluating the consistency and validity of heading expressions for summarizing on-screen components.

BACKGROUND ART

When the consistency and validity of heading expressions for a system's GUI (graphical user interface) are to be evaluated, for instance, to check whether individual screens have standardized heading expressions and use valid heading expressions, it is preferable that heading expressions used in all screens targeted for evaluation be checked in consideration of their hierarchical relationship to extract any inconsistent portions. Therefore, if this evaluation is performed manually, increased workload is imposed on an evaluator. Further, the evaluator may fail, for instance, to detect some problems because it is difficult to specify the hierarchical levels of heading expressions. Consequently, the result of evaluation is likely to vary from one evaluator to another.

For example, a first related art is a technology related to a GUI automatic evaluation device that is described in Patent Document 1. The GUI automatic evaluation device inputs screen design guide data, stores the input guide data as formal rules, prepares GUI information that includes window-specific attribute information and attribute values representing GUI object data of an evaluation target system, compares the prepared GUI information against the stored rules, and outputs the window-specific result of comparison to indicate compliance with the rules. Patent Document 1 also describes means for generating GUI information, for instance, from product specifications, sources, and GUI building tools.

A second related art is a technology related to a testing device that is described in Patent Document 2. The testing device is capable of conducting a test in which a predetermined operating procedure is automatically performed. The testing device uses an operation database to store a user sequence, which is to be designated by a user at the time of testing, and a complementary sequence which ensures that the user sequence is executed in a specified manner, and verifies the status of a GUI portion when the user sequence is executed in the specified manner. The testing device executes the user sequence whenever it can be executed. However, when the user sequence cannot be executed, the testing device retrieves an appropriate complementary sequence, executes the retrieved complementary sequence, and then executes the user sequence.

A third related art is a technology related to a web screen creation tool and terminology check tool described in Patent Document 3. These tools check a web screen source file by using terminology pre-registered for verifying homonyms, declensional Kana endings, and synonyms which are prone to error when they are written. When any pre-registered term is detected within a web screen to be evaluated, these tools display a list of possible corrections for the detected term.

CITATION LIST

Patent Literature

Patent Document 1 Japanese Patent Application Publication No. 1996-241191
Patent Document 2 Japanese Patent Application Publication No. 2004-110267
Patent Document 3 Japanese Patent Application Publication No. 2004-234402

SUMMARY OF THE INVENTION

Technical Problem

A problem is that when the consistency of heading expressions used in the entire system and the validity of heading expressions used in various screens are evaluated, some portions are likely to be left unchecked due to an increased workload on an evaluator. One reason is that it is difficult for the evaluator to specify a heading expression group to be subjected to consistency evaluation because the screens to be evaluated may differ in the structure of displayed information and use a plurality of heading expressions to indicate a hierarchical structure. Another reason is that the evaluator has to check and record the heading expressions used in each screen to be evaluated.

The GUI automatic evaluation device described in Patent Document 1 needs to input screen design guide data and create rules. However, it is difficult to input the screen design guide data for properly creating the rules for evaluating the consistency of heading expressions. For example, it is necessary not only to acquire the property values of the components of each screen and extract text portions other than text (item names) attached to input parts and guidance messages (e.g., instructive or descriptive messages) for a user, but also to specify the hierarchical relationship among a plurality of heading expressions when they are used in screens.

The testing device described in Patent Document 2 is capable of checking whether or not a predetermined user sequence is properly executed. For the testing device, however, it is necessary to prepare sequences in accordance with the system to be evaluated. In addition, the testing device cannot evaluate a GUI portion within a sequence execution or evaluate the sequences themselves.

The web screen creation tool and terminology check tool described in Patent Document 3 cannot evaluate the usability characteristics of terms other than unregistered ones.

The present invention has been made in view of the above circumstances. An object of the present invention is to provide a GUI evaluation system, GUI evaluation method, and GUI evaluation program that are capable of comprehensively and unfailingly evaluating the consistency of heading expressions used in a plurality of screens targeted for evaluation.

Solution to Problem

A GUI evaluation system according to the present invention is a GUI evaluation system including GUI information storage means, heading group specification means, and heading expression evaluation means. The GUI information storage means stores GUI information that concerns a heading included in an evaluation target screen and includes information indicative of a heading expression which is the expression used for the heading. The heading group specification means groups headings included in each evaluation target screen by expression used for the headings in accordance with the GUI information stored in the GUI information storage means. The heading expression evaluation means evaluates a consistency of heading expressions between a plurality of evaluation target screens by comparing heading groups that are grouped by the heading group specification means and included in all possible combinations of two of the plurality of evaluation target screens.

A GUI evaluation method according to the present invention is a GUI evaluation method comprising the steps of: grouping prerecorded headings included in each evaluation target screen by expression used for the headings in accordance with the GUI information including information indicative of a heading expression which is the expression used for the heading; and evaluating a consistency of the heading expressions between a plurality of evaluation target screens by comparing heading groups that are grouped according to the expressions and included in all possible combinations of two of the plurality of evaluation target screens.

A GUI evaluation program according to the present invention is a GUI evaluation program making a computer perform: a heading group specification process for grouping prerecorded headings included in each evaluation target screen by expression used for the headings in accordance with the GUI information including information indicative of heading expressions which are the expressions used for the headings; and a heading expression evaluation process for evaluating the consistency of the heading expressions between a plurality of evaluation target screens by comparing heading groups that are grouped by the heading group specification means and included in all possible combinations of two of the plurality of evaluation target screens.

Advantageous Effects of the Invention

The present invention makes it possible to comprehensively and unfailingly evaluate the consistency of heading expressions used in each of a plurality of evaluation target screens.

BRIEF DESCRIPTION OF DRAWINGS

FIG. 4 It depicts an example of an evaluation target screen.

FIG. 5 It depicts an example of GUI information stored in a GUI information recording section 4.

FIG. 6 It depicts an example of heading group information.

FIG. 9 It depicts another example of the evaluation target screen.

FIG. 10 It depicts another example of the evaluation target screen.

FIG. 11 It depicts an example of a judgment result presented by the heading expression judgment section 3.

FIG. 13 It depicts another example of a judgment result presented by the heading expression judgment section 3.

DESCRIPTION OF EMBODIMENTS

Figure 1:
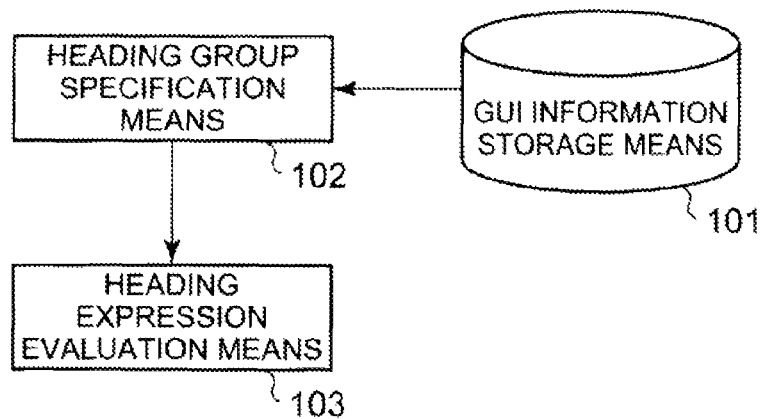
FIG. 1 It depicts a block diagram illustrating an example configuration of a GUI evaluation system according to the present invention.

Embodiments of the present invention will now be described with reference to the accompanying drawings. FIG. 1 is a block diagram illustrating an example configuration of a GUI evaluation system according to the present invention. The GUI evaluation system shown in FIG. 1 includes GUI information storage means 101, heading group specification means 102, and heading expression evaluation means 103.

The GUI information storage means 101 stores GUI information including information indicative of heading expression used for heading included in an evaluation target screen.

The heading group specification means 102 groups headings included in each evaluation target screen by expression used for the headings in accordance with the GUI information stored in the GUI information storage means 101 (classifies the headings by group).

The heading expression evaluation means 103 evaluate the consistency of heading expressions between a plurality of evaluation target screens by comparing heading groups that are grouped by the heading group specification means 102 and included in all possible combinations of two of the plurality of evaluation target screens.

The heading expression evaluation means 103 may compare the heading expressions between heading groups between two of the plurality of evaluation target screens. When any of the heading groups included in an evaluation target screen having a relatively small number of heading groups disagrees with all the heading groups included in the other evaluation target screen, the heading expression evaluation means 103 may conclude that the heading expressions are not consistent.

The GUI information storage means 101 may store GUI information that concerns heading included in an evaluation target screen and includes information indicative of a heading expression for the heading and information indicative of an on-screen position of the heading. In such an instance, the heading group specification means 102 may achieve grouping by specifying the headings that are included in the evaluation target screen and agree with each other in the employed expression and in either the vertical or horizontal on-screen position, as members of the same heading group, in accordance with the GUI information stored in the GUI information storage means 101. Further, when a heading belonging to a first heading group is positioned within an evaluation target screen and above the leftmost heading belonging to a second heading group, the difference between the horizontal position of the leftmost heading belonging to the second heading group and the horizontal position of the heading belonging to the first heading group may be specified as an indent for the second heading group.

When an indent for a heading group is specified by the heading group specification means 102, the heading expression evaluation means 103 may compare the heading expressions and indents for heading groups between two of the plurality of evaluation target screens. When any of the heading groups included in an evaluation target screen having a relatively small number of heading groups disagrees with all the heading groups included in the other evaluation target screen, the heading expression evaluation means 103 may conclude that the heading expressions are not consistent.

Figure 2:
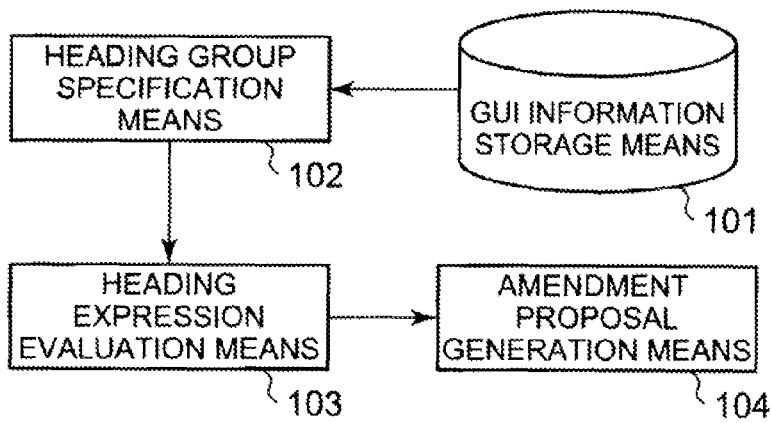
FIG. 2 It depicts a block diagram illustrating another example configuration of the GUI evaluation system according to the present invention.

FIG. 2 is a block diagram illustrating another example configuration of the GUI evaluation system according to the present invention. As shown in FIG. 2, the GUI evaluation system may further include amendment proposal generation means 104. The amendment proposal generation means 104 specifies the hierarchical structure of heading expressions in an evaluation target screen having the largest number of different heading expressions (i.e., the evaluation target screen having the largest number of heading groups) in accordance with heading expression positions in the evaluation target screen, and generates an amendment proposal indicative of heading expression changes in headings included in a screen involving an inconsistency in such a manner that the hierarchical structure of heading expressions in the screen involving an inconsistency agrees with a downwardly traced hierarchical structure or upwardly traced hierarchical structure that is a part of the hierarchical structure of heading expressions in the screen having the largest number of different heading expressions.

First Embodiment

Figure 3:
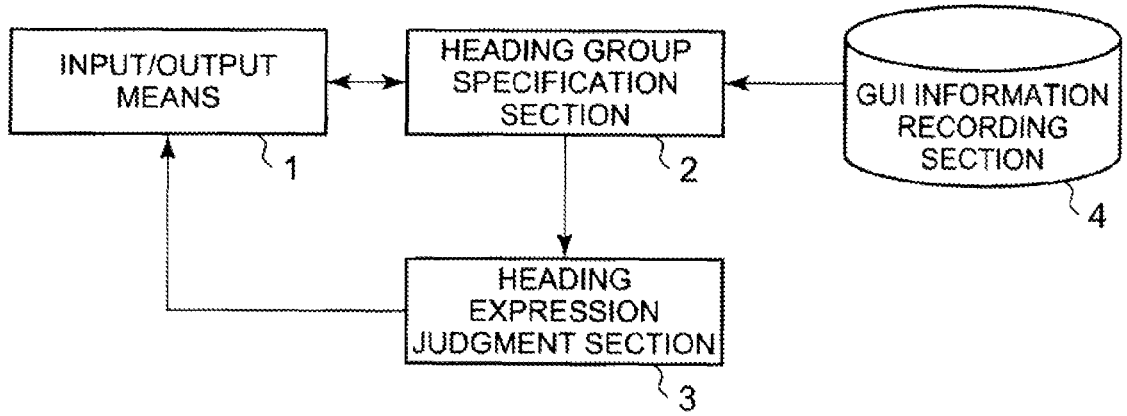
FIG. 3 It depicts a block diagram illustrating an example configuration of the GUI evaluation system according to a first exemplary embodiment of the present invention.

Embodiments of the present invention will now be described in greater detail. FIG. 3 is a block diagram illustrating an example configuration of the GUI evaluation system according to a first exemplary embodiment of the present invention. The GUI evaluation system shown in FIG. 1 includes input/output means 1, a heading group specification section 2, a heading expression judgment section 3, and a GUI information recording section 4.

The heading group specification section 2 is a processing section equivalent to the aforementioned heading group specification means 102. The heading expression judgment section 3 is a processing section equivalent to the aforementioned heading expression evaluation means 103. The GUI information recording section 4 is a storage section equivalent to the aforementioned GUI information recording storage 101.

The input/output means 1 includes input means and output means. The input means is a mouse, keyboard, or other device for entering information that indicates the operation to be performed by an evaluator. The output means is a display or other output device.

The GUI information recording section 4 stores GUI information that includes information indicative of expressions used for headings (hereinafter referred to as the heading expressions) included in an evaluation target screen. In the present exemplary embodiment, the GUI information should at least relate to a screen identifier for identifying the evaluation target screen and heading expression identifiers for identifying headings included in the evaluation target screen, and include information indicative of heading expressions for the headings and information indicative of on-screen positions of the headings. The information indicative of heading expressions is the information that identifies the expressions used for the headings. More specifically, the information indicative of heading expressions may indicate, for example, a distinctive expression used at the beginning of a heading (a particular expression representing a heading), a background color, a type, size, and color of font, the presence of a line, and coloration. The information indicative of heading expressions should include at least one of these pieces of information.

FIG. 4 shows an example of an evaluation target screen. The evaluation target screen shown in FIG. 4 is named "window A." The screen area of window A includes headings A1, A2, A3, A4, and A5.

FIG. 5 shows an example of GUI information stored in the GUI information recording section 4. As shown in FIG. 5, the GUI information used in the present exemplary embodiment may include, for example, a screen name for identifying a screen, a heading name for identifying a heading included in the screen, a distinctive expression used at the beginning of the heading (symbol, icon, serial number, etc.), the information about text color, background color, and font (type, size, and effects), line information (presence, type, and color of line), and coordinates. The example shown in FIG. 5 illustrates headings included in the evaluation target screen shown in FIG. 4 and describes the information about a total of six headings (headings A1 to A6).

In the present exemplary embodiment, a method for generating the GUI information is not specifically limited. The evaluator may generate the GUI information by making manual entries in accordance with a predetermined heading definition range. Alternatively, the GUI information may be generated by acquiring screen information from applicable specifications and an actual system and subjecting the acquired screen information to syntax analysis, layout analysis, or other analysis based on an existing technology. The term "heading" generally denotes information that describes the contents of groups into which components are grouped, and represents information other than item names relevant to input parts and guidance messages (e.g., instructive or descriptive messages) for a user. However, the definition range of the term "heading" may vary from one evaluation target system to another. In the present exemplary embodiment, the heading expressions are evaluated in accordance with the GUI information stored in the GUI information recording section 4.

The heading group specification section 2 references the GUI information stored in the GUI information recording section 4, and groups the headings included in an evaluation target screen in accordance with expressions used for the headings and the positions of the headings. Here, the headings that exist in the evaluation target screen, have the same expression, and have the same x-coordinate or y-coordinate are grouped, or more specifically, specified as the members of the same heading group. Further, when a plurality of heading groups exist in the evaluation target screen, no on-screen heading belonging to the same heading group is positioned on the left of a target heading, a heading belonging to another heading group is positioned above the target heading, and the x-coordinate difference between the target heading and the heading positioned above the target heading is a plus value, the heading group specification section 2 identifies the plus value as an indent for the heading group to which the target heading belongs. The indent for the heading group is handled as a heading expression for differentiating the heading group from another heading group. Moreover, the heading group specification section 2 generates information about an specified heading group and outputs the generated information to the heading expression judgment section 3 as heading group information.

FIG. 6 shows an example of the heading group information that is output from the heading group specification section 2. As shown in FIG. 6, the heading group information may be associated, for instance, with a screen name and a heading group name for identifying a heading group, and include the name of a heading belonging to the heading group, the information about a heading expression for the heading group (initial distinctive expression, text color, background color, font information, line information, etc.), and the indent value. The example shown in FIG. 6 illustrates the heading group information that is created in accordance with the GUI information shown in FIG. 5. More specifically, the six headings are classified into three heading groups (heading groups AG1, AG2, and AG3) according to their expressive element and position.

In accordance with the heading group information generated by the heading group specification section 2, the heading expression judgment section 3 evaluates the consistency of heading expressions by checking whether heading groups used in two evaluation target screens are identical with each other. More specifically, the heading expression judgment section 3 compares the number of heading groups between the two evaluation target screens and checks whether the heading expressions used for the heading groups in a screen having a relatively small number of heading groups agree with the heading expressions used for the heading groups in the other screen. When any conflicting heading expression exists, the heading expression judgment section 3 concludes that there is a consistency problem. The heading expression judgment section 3 performs the above-described judgment process on all combinations of the evaluation target screens to generate a comprehensive judgment result concerning all the combinations, and outputs the comprehensive judgment result to the input/output means 1. If any combination reveals a consistency problem, the heading expression judgment section 3 may conclude that there is an overall consistency problem. When, on the contrary, no combination reveals a consistency problem, the heading expression judgment section 3 may conclude that there is no overall consistency problem.

In the present exemplary embodiment, the heading group specification section 2 and the heading expression judgment section 3 are implemented, for instance, by a CPU that operates in accordance with a program. The GUI information recording section 4 is implemented by a storage device.

Figure 7:
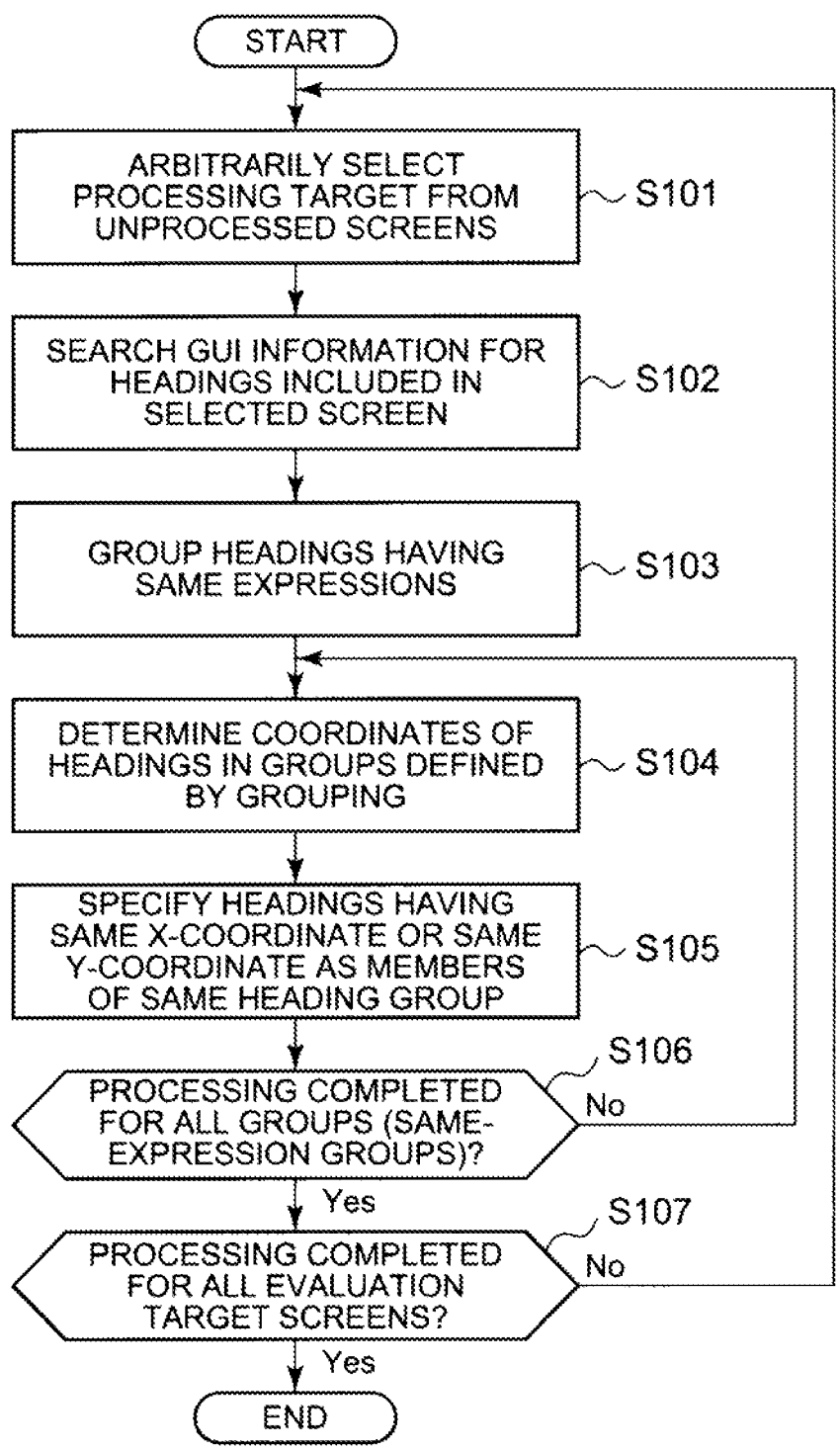
FIG. 7 It depicts a flowchart illustrating an example of a heading group specification operation by a heading group specification section 2.

An operation of the present exemplary embodiment will now be described. FIG. 7 is a flowchart illustrating an example of a heading group specification operation by the heading group specification section 2. As shown in FIG. 7, the heading group specification section 2 first arbitrarily selects a processing target from unprocessed evaluation target screens (step S101).

Next, the heading group specification section 2 searches the GUI information stored in the GUI information recording section 4 for headings included in the selected screen and group the headings having the same expressions into the same groups (step S102, S103). These groups are then referred to as the same-expression groups.

After the headings having the same expressions are grouped as described above, the heading group specification section 2 determines the coordinates of the headings in the same-expression groups (step S104). The heading group specification section 2 specifies headings having the same x-coordinate or the same y-coordinate as the members of the same heading group (step S105). The heading group specification section 2 may assign an identifier for specifying a heading group and generate information indicative of the relationship between the identifier and an identifier of a heading expression belonging to the heading group.

When a process for grouping into heading groups is not completed for all the same-expression groups (when the query in step S106 is answered "NO"), the heading group specification section 2 repeatedly subjects an unprocessed same-expression group to the process for grouping into heading groups in accordance with the coordinates (returns to step S104). When the process for grouping into heading groups is completed for all the same-expression groups (when the query in step S106 is answered "YES") and the process for grouping into heading groups is not completed for all the processing target screens (when the query in step S107 is answered "NO"), the heading group specification section 2 returns to step S101 and repeats the above-described process with an unprocessed screen selected as a processing target screen.

Figure 8:
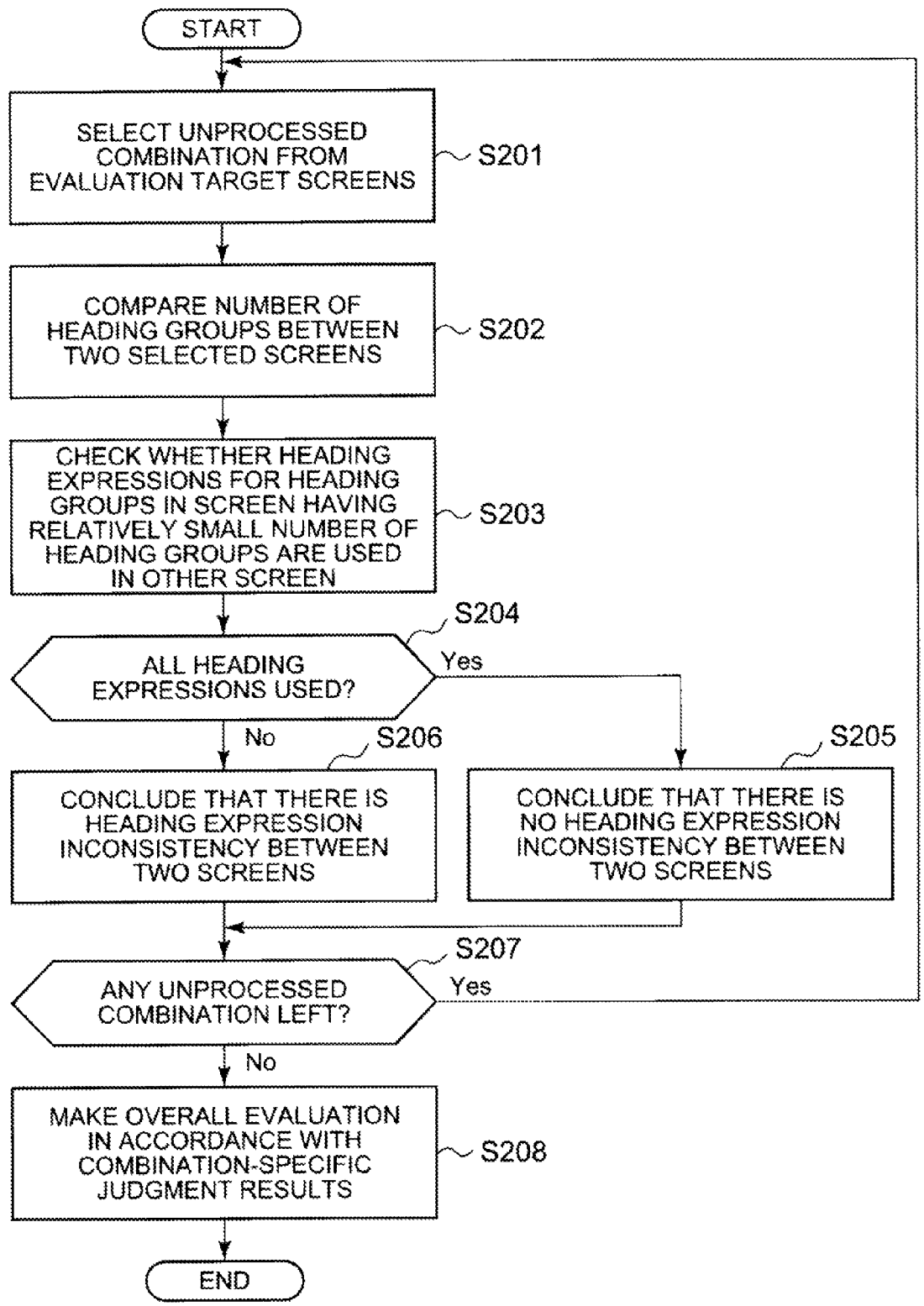
FIG. 8 It depicts a flowchart illustrating an example of a heading expression consistency judgment operation by a heading expression judgment section 3.

FIG. 8 is a flowchart illustrating an example of a heading expression consistency judgment operation by the heading expression judgment section 3. As shown in FIG. 8, the heading expression judgment section 3 first selects a combination of two unprocessed screens from the evaluation target screens as a processing target (step S201). Next, the heading expression judgment section 3 compares the number of heading groups between the two selected screens (step S202). The heading expression judgment section 3 judges whether heading expressions used in the heading groups included in a screen having a relatively small number of heading groups agree with heading expressions used in the heading groups included in the other screen (step S203).

When all the heading expressions used in the heading groups included in the screen having a relatively small number of heading groups are used in any of the heading groups included in the other screen (when the query in step S204 is answered "YES"), the heading expression judgment section 3 concludes that the heading expressions used in the two screens are consistent (step S205). When, on the other hand, any heading expression used in the screen having a relatively small number of heading groups is missing from the other screen, the heading expression judgment section 3 concludes that the heading expressions used in the two screens are inconsistent (step S206).

If the above-described heading expression consistency judgment process is not completed for all possible combinations of the evaluation target screens (if the query in step S207 is answered "YES"), the heading expression judgment section 3 repeats the above-described process with an unprocessed screen combination selected as a processing target (returns to step S201).

If the heading expression consistency judgment process is completed for all possible combinations (if the query in step S207 is answered "NO"), the heading expression judgment section 3 makes an overall evaluation in accordance with the results of combination-specific judgments (step S208).

An operation of the present exemplary embodiment will now be described with reference to concrete screen examples. In a first example, window A shown in FIG. 4, window B shown in FIG. 9, and window C shown in FIG. 10 are used as the evaluation target screens.

First of all, the heading group specification section 2 classifies the headings included in window A into the same-expression groups in accordance with the GUI information stored in the GUI information recording section 4. In the present example, the heading expressions for a total of six headings (headings A1 to A6) in window A are checked to specify headings having the same expression as the members of the same group. For example, expressive elements (initial distinctive expression, text color, background color, font, line, etc.) of the headings are compared as the information about heading expressions to specify headings having entirely the same expressive elements as the members of the same group. In the present example, heading A1 is specified as a member of one same-expression group, headings A2 and A5 are specified as members of another same-expression group, and headings A3, A4, and A6 are specified as members of still another same-expression group.

Further, the heading group specification section 2 compares the coordinates of the headings belonging to the same-expression group, and identifies headings having the same x-coordinate or the same y-coordinate as the members of the same heading group. In the present example, heading A1, which has no comparison target, is specified as a heading group (AG1). As regards the same-expression group including headings A2 and A5, the example shown in FIG. 5 indicates that headings A2 and A5 have the same x-coordinate (x=15). Therefore, headings A2 and A5 are specified as the members of another heading group (AG2). As regards the same-expression group including headings A3, A4, and A6, the example shown in FIG. 5 indicates that any two of the headings A3, A4, and A6 have the same x-coordinate (x=25) or the same y-coordinate (y=80). Therefore, headings A3, A4, and A6 are specified as the members of still another heading group (AG3). The heading group specification section 2 concludes that window A uses three heading groups (AG1, AG2, and AG3), generates heading group information shown in FIG. 6, and outputs the heading group information to the heading expression judgment section 3.

Furthermore, the heading group specification section 2 performs the same process for windows B and C as for window A, generates the heading group information about windows B and C, and outputs the generated heading group information to the heading expression judgment section 3. In the present example, a total of two heading groups are specified from window B which has headings B1, B2, and B3. More specifically, headings B1 and B3 are specified as members of one heading group (BG1), and heading B2 is specified as a member of another heading group (BG2). Thus, the heading group specification section 2 concludes that window B uses a total of two heading groups, namely, heading group BG1 to which headings B1 and B3 belong and heading group BG2 to which heading B2 belongs, and outputs the heading group information about window B.

As regards window C which has headings C1 and C2, the heading group specification section 2 identifies one heading group (CG1) to which headings C1 and C2 belong. Thus, the heading group specification section 2 concludes that window C uses one heading group (CG1) to which headings C1 and C2 belong, and outputs the heading group information about window C.

Next, the heading expression judgment section 3 references the heading group information about each screen which is output from the heading group specification section 2, and compares the heading expressions for the heading groups between all screen combinations. As regards windows A and B, heading group AG1 and heading group BG1 have the same heading expressions, and heading group AG2 and heading group BG2 have the same heading expressions. Therefore, the heading expression judgment section 3 concludes that the compared heading groups are identical with each other. Further, as all the heading groups in window B which has a relatively small number of heading groups (two heading groups) are included in the heading groups (three heading groups) in the other window (window A), the heading expression judgment section 3 concludes that there is no consistency problem between the above two screens.

As regards windows A and C, heading group AG1 and heading group CG1 have the same heading expressions. Therefore, the heading expression judgment section 3 concludes that these heading groups are identical with each other. Further, as all the heading groups in window C which has a relatively small number of heading groups (one heading group) are included in the heading groups (three heading groups) in the other window (window A), the heading expression judgment section 3 concludes that there is no consistency problem between the above two screens. As regards windows B and C, heading group BG1 and heading group CG1 have the same heading expressions. Therefore, the heading expression judgment section 3 concludes that these heading groups are identical with each other. Further, as all the heading groups in window C which has a relatively small number of heading groups (one heading group) are included in the heading groups (two heading groups) in the other window (window B), the heading expression judgment section 3 concludes that there is no consistency problem between the above two screens.

As no combination reveals a consistency problem, the heading expression judgment section 3 concludes that there is no overall consistency problem when the comparisons of all screen combinations are completed. FIG. 11 shows an example of a judgment result presented by the heading expression judgment section 3. As shown in FIG. 11, the heading expression judgment section 3 may present information about each combination, which includes judgment results, information about common heading groups, and information about uncommon heading groups, while presenting an overall judgment result to indicate whether there is a consistency problem. The example shown in FIG. 11 indicates the result of overall judgment and the results of comparison between the individual screens.

As described above, the same heading groups are specified in accordance with the expressive elements and positions of the headings in the evaluation target screens, and all combinations of two evaluation target screens are compared with each other to judge whether the heading groups used in a screen having a relatively small number of heading groups are included in the heading groups used in the other screen. Thus, the consistency of heading expressions in a plurality of screens can be evaluated.

Figure 12:
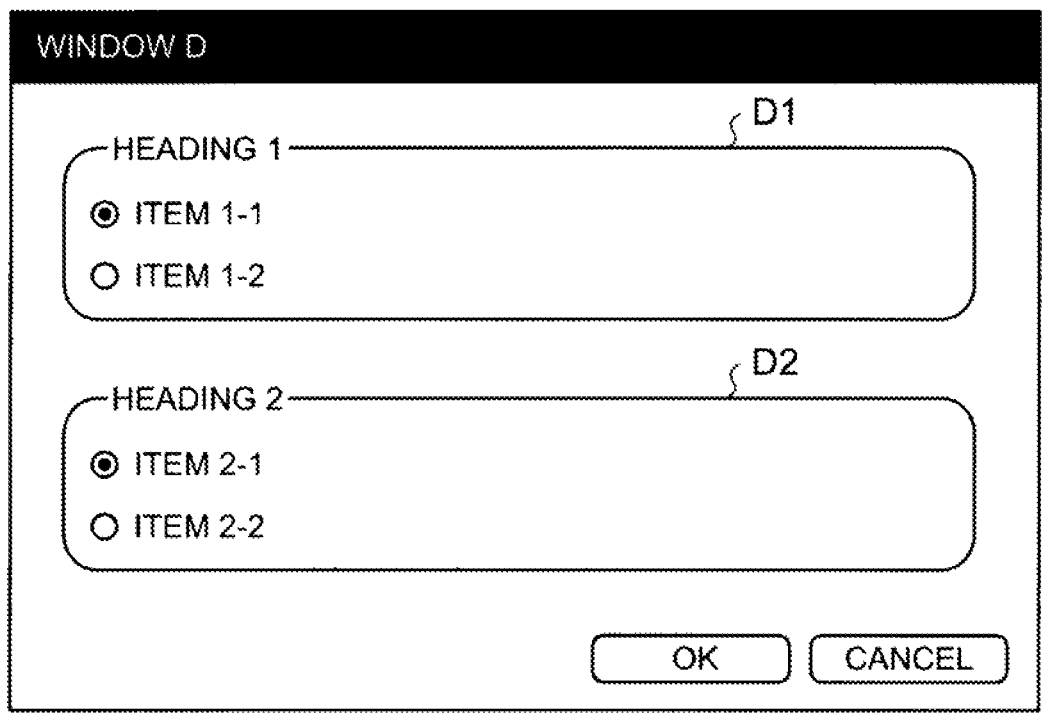
FIG. 12 It depicts another example of the evaluation target screen.

A second concrete example of an operation of the present exemplary embodiment will now be described with reference to a case where window D shown in FIG. 12 is handled as one of the evaluation target screens.

The heading group specification section 2 performs the same process for window D as for windows A, B, and C, generates the heading group information about window D, and outputs the generated heading group information to the heading expression judgment section 3. In the present example, the heading expressions for a total of two headings (D1 and D2) are located in window D so that headings having the same expressions are specified as members of the same group. More specifically, headings D1 and D2 are specified as members of one same-expression group. Further, the heading group specification section 2 compares the coordinates of the headings belonging to the same-expression group, and identifies headings having the same x-coordinate or the same y-coordinate as the members of the same heading group. In the present example, headings D1 and D2 are specified as the members of one heading group (DG1) because they have the same y-coordinate. The heading group specification section 2 then outputs heading group information to indicate that window D uses one heading group (DG1) to which headings D1 and D2 belong.

Next, the heading expression judgment section 3 references the heading group information about each screen, which is output from the heading group specification section 2, and compares the heading expressions for the heading groups between all screen combinations. Here, the heading expression judgment section 3 additionally performs the same process for the combinations of windows A and D, windows B and D, and windows C and D as for the window combinations compared as described in connection with the first operation example.

As regards windows A and D, heading group AG3 and heading group DG1 have the same heading expressions. Therefore, the heading expression judgment section 3 concludes that these heading groups are identical with each other. Further, as all the heading groups in window D which has a relatively small number of heading groups (one heading group) are included in the heading groups (three heading groups) in the other window (window A), the heading expression judgment section 3 concludes that there is no consistency problem.

As regards windows B and D, the heading expressions for heading group DG1 disagree with any one of all the heading expressions for heading groups BG1 and BG2. Thus, the heading expression judgment section 3 concludes that there is a consistency problem as one of the heading groups in window D which has a relatively small number of heading groups (one heading group) is not included in the heading groups (two heading groups) in the other window (window B). In this instance, the judgment result output may include, as an uncommon element, the information about heading group DG1 which is a heading group in a screen having a relatively small number of groups. The information about a heading group may be the information that enables the evaluator to recognize the heading group (i.e., an employed heading expression or the name of a heading included in the heading group).

As regards windows C and D, the heading expressions for heading group CG1 disagree with the heading expressions for heading group DG1. Thus, the heading expression judgment section 3 concludes that there is a consistency problem as one of the heading groups in window D which has a relatively small number of heading groups (one heading group) is not included in the heading groups (two heading groups) in the other window (window B). In this instance, the judgment result output may include, as an uncommon element, the information indicative of the inconsistent heading group. In the present example, as windows C and D are equal in the number of heading groups, the judgment result output may include the information indicative of the heading groups (heading groups CG1 and DG1) included in windows C and D.

As a certain combination reveals a consistency problem, the heading expression judgment section 3 concludes that there is an overall consistency problem when the comparisons of all screen combinations are completed. FIG. 13 shows an example of a judgment result presented by the heading expression judgment section 3. The example shown in FIG. 13 indicates, for instance, that a consistency problem is revealed by an overall judgment result, and that there is a consistency problem with the combination of windows B and D and the combination of windows C and D. The example shown in FIG. 13 indicates an overall judgment result, lists problematic screen combinations, and identifies heading groups having different expressions.

As described above, the same heading groups are specified in accordance with the expressive elements and positions of the headings in the evaluation target screens, all combinations of two evaluation target screens are compared to judge whether the heading groups used in a screen having a relatively small number of heading groups are included in the heading groups used in the other screen, and the information about the combinations of screens having conflicting heading groups as well as the information about uncommon elements are out put. Thus, the evaluation of heading expression consistency between a plurality of screens and the specification of consistency problems (improvements to be made) can be achieved.

Figure 14:
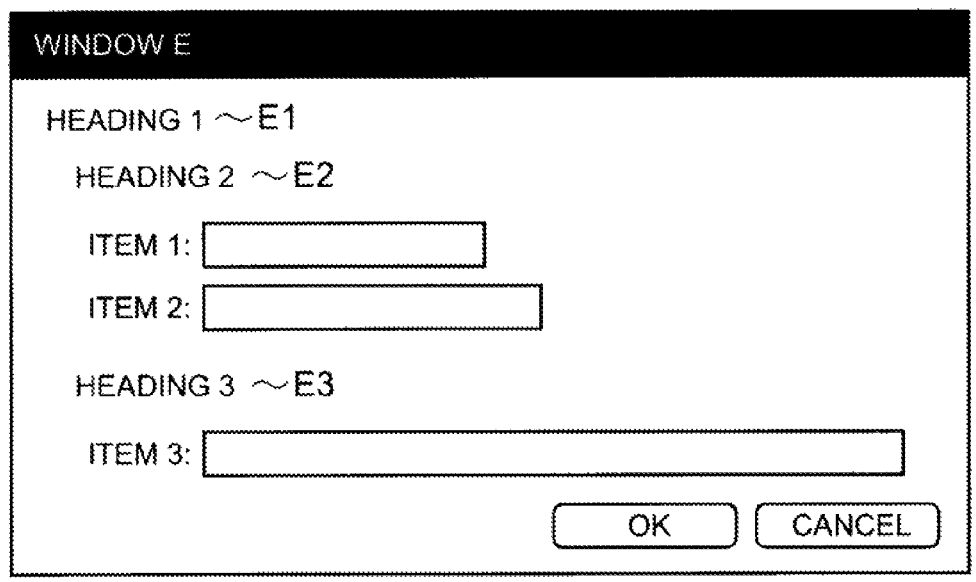
FIG. 14 It depicts another example of the evaluation target screen.
Figure 15:
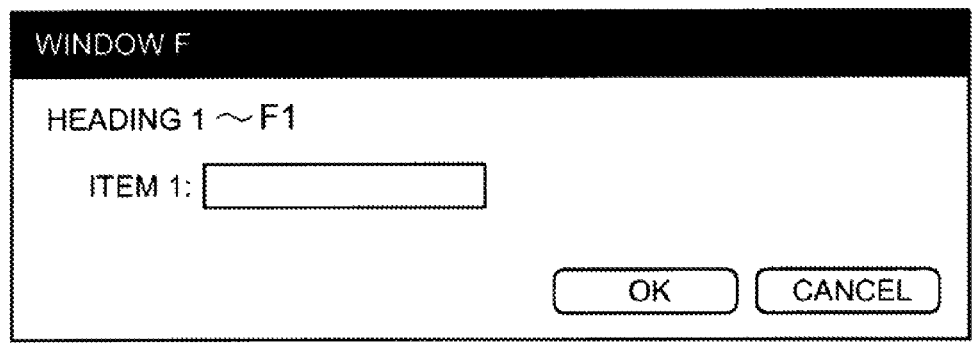
FIG. 15 It depicts still another example of the evaluation target screen.

A third concrete example of an operation of the present exemplary embodiment will now be described with reference to a case where window E shown in FIG. 14 and window F shown in FIG. 15 are handled as the evaluation target screens.

First of all, the heading group specification section 2 classifies headings included in window E into same-expression groups in accordance with the GUI information stored in the GUI information recording section 4. In the present example, the heading expressions for a total of three headings (headings E1, E2, and E3) in window E are examined to classify headings having the same expressions into same-expression groups. Here, headings E1, E2, and E3 are specified as members of one same-expression group. Further, the heading group specification section 2 compares the coordinates of the headings belonging to each same-expression group, and identifies headings having the same x-coordinate or the same y-coordinate as the members of the same heading group. In the present example, the x- and y-coordinates of heading E1 do not agree with any one of headings E2 and E3. Therefore, heading E1 is specified as a member of a heading group (EG1) that differs from a heading group to which headings E2 and E3 belong. As headings E2 and E3 have the same x-coordinate, they are specified as members of the same heading group (EG2). The heading group specification section 2 then outputs heading group information to indicate that window E uses two heading groups, namely, heading group EG1 to which heading E1 belongs and heading group EG2 to which headings E2 and E3 belong, due to the judgment of coordinates although the three headings use the same heading expressions. When, as in the present example, a plurality of heading groups are specified from the same-expression group into which headings having the same expressions are grouped, the heading groups may be differentiated from each other by causing the heading expressions for each heading group to include an indent value as an expressive element.

The heading group specification section 2 performs the same process for window F as for window E, generates the heading group information about window F, and outputs the generated heading group information to the heading expression judgment section 3. In the present example, heading F1 is specified as a member of one heading group (FG1). Thus, the heading group specification section 2 outputs the heading group information to indicate that window F uses one heading group FG1 to which heading F1 belongs.

Next, the heading expression judgment section 3 references the heading group information about each screen, which is output from the heading group specification section 2, and compares the heading expressions for the heading groups between all screen combinations. As regards windows E and F, the heading expression judgment section 3 concludes that heading groups EG1 and FG1 belong to the same heading group because they have the same heading expressions (including the indent value). Further, as the heading group in window F which has a relatively small number of heading groups (one group) is included in the heading groups (two heading groups) in the other window (window E), the heading expression judgment section 3 concludes that there is no consistency problem between the above two screens.

As described above, heading groups having the same expressions, such as coloration, lines, and font types, can be specified as different heading groups in accordance with on-screen positional relationship. Therefore, even when distinctive expressions are not substantially used for individual headings, the headings can be differentiated from each other as far as they differ in hierarchical structure. As a result, consistency can be properly evaluated.

Consequently, the use of the GUI evaluation system according to the present exemplary embodiment makes it possible to comprehensively and unfailingly evaluate the consistency of heading expressions used in a plurality of evaluation target screens and specify consistency problems (improvements to be made).

Second Embodiment

Figure 16:
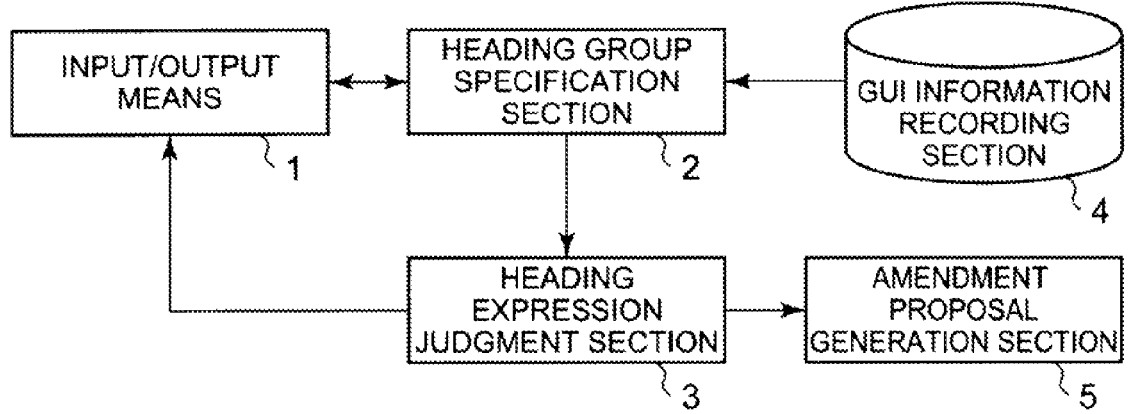
FIG. 16 It depicts a block diagram illustrating an example configuration of the GUI evaluation system according to a second exemplary embodiment of the present invention.

A second exemplary embodiment of the present invention will now be described. FIG. 16 is a block diagram illustrating an example configuration of the GUI evaluation system according to the second exemplary embodiment. The GUI evaluation system shown in FIG. 16 differs from that according to the first exemplary embodiment, which is shown in FIG. 3, in that the former includes an amendment proposal generation section 5. The amendment proposal generation section 5 is a processing section equivalent to the amendment proposal generation means 104 shown in FIG. 2. In the second exemplary embodiment, the amendment proposal generation section 5 is implemented, for instance, by a CPU that operates in accordance with a program.

The amendment proposal generation section 5 generates and presents a heading expression amendment proposal for a screen having a consistency problem. The amendment proposal generation section 5 first extracts a list of heading expressions (i.e., heading groups) that are used in a screen having the largest number of different heading expressions. Next, the amendment proposal generation section 5 identifies the hierarchical structure of the heading expressions by specifying the hierarchical levels of the heading expressions in accordance with the positional relationship between headings provided with the heading expressions. The amendment proposal generation section 5 then selects and presents an expression amendment proposal for a screen having a consistency problem in accordance with the hierarchical levels.

Figure 17:
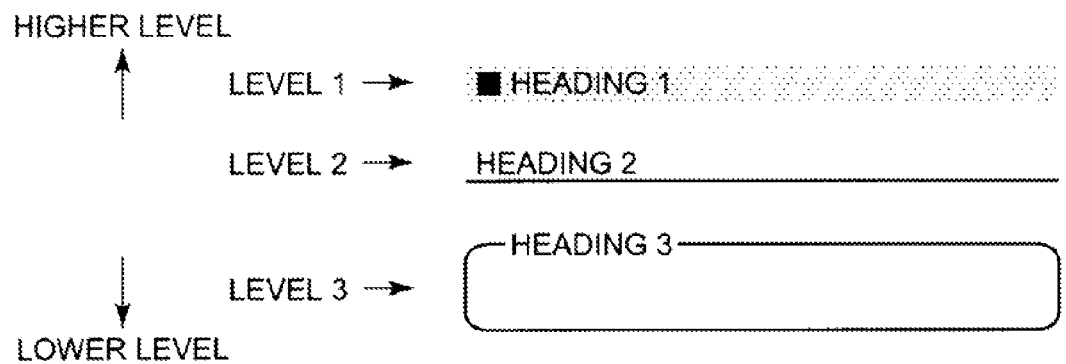
FIG. 17 It depicts a list of heading expressions and an example of hierarchical levels.

FIG. 17 relates to windows A, B, C, and D, which are used as concrete examples to describe the first exemplary embodiment, and shows a list of extracted different heading expressions and an example of specified hierarchical levels. The list of different heading expressions corresponds to the list of heading expressions for heading groups in the first exemplary embodiment. As regards windows A, B, C, and D, therefore, a list of heading expressions used for the three heading groups AG1, AG2, AG3 is extracted from window A which has the largest number of heading groups. Further, the hierarchical level of each heading expression may be specified by comparing the y-coordinate of a heading placed at the highest position in one heading group between heading groups. More specifically, a heading placed at a higher position than the other headings in each heading group may be compared between individual heading groups. Thus, a heading expression for a heading group to which a heading placed at the highest position belongs may be specified as a heading expression for the highest hierarchical level, and a heading expression for a heading group to which a heading placed at the lowest position belongs may be specified as a heading expression for the lowest hierarchical level.

In the example shown in FIG. 17 which shows heading expressions for three heading groups, the heading expression for a heading group to which heading A1 belongs is specified as a heading expression for the highest hierarchical level (level 1), the heading expression for a heading group to which heading A2 belongs is specified as a heading expression for the second highest hierarchical level (level 2), and the heading expression for a heading group to which heading A2 belongs is specified as a heading expression for the lowest hierarchical level (level 3). It should be noted, however, that the hierarchical structure of heading expressions may be specified by the heading expression judgment section 3.

In accordance with the hierarchical structure of heading expressions which is specified as described above, the amendment proposal generation section 5 presents an amendment proposal. More specifically, the amendment proposal generation section 5 presents an amendment proposal for changing a conflicting heading expression for a heading group, which is specified as an uncommon element in a combination of screens having a consistency problem, until it agrees with a heading expression for a heading group included in one screen in the screen combination. When windows A, B, C, and D, which are used as example screens to describe the first exemplary embodiment, are handled as evaluation target screens, a consistency problem is found in the screen combination of windows B and C and in the screen combination of windows C and D. In such a case, an amendment proposal may be generated after determining whether higher- or lower-level heading expressions in windows B, C, and D are to be preferentially used.

Figure 18:
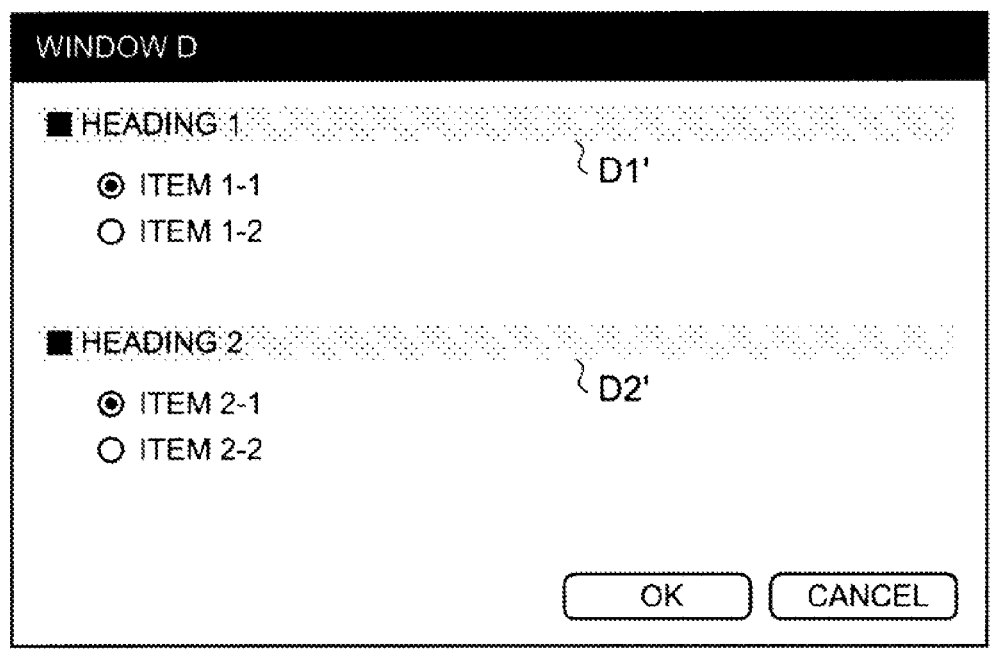
FIG. 18 It depicts an example of an amendment proposal.

When, for instance, the higher-level heading expressions are to be preferentially used, the heading expression for each heading belonging to heading group DG1 in window D may be changed in such a manner that the heading expression for heading group DG1 which is the highest-level heading group in window D agrees with the heading expression for heading group AG1 which is the highest-level heading group in the list. FIG. 18 shows an example of an amendment proposal. In the example shown in FIG. 18, headings D1 and D2 in window D are changed to headings D1' and D2', which have the same heading expression as heading A1 in window A. It is concluded that windows B and C need not be changed because their higher-level heading expressions are preferentially used.

When, on the other hand, the lower-level heading expressions are to be preferentially used, the heading expressions in the list may be sequentially applied to the heading groups included in windows B and C in order from the lowest level to the highest level. For example, the heading expression for each heading belonging to heading group BG2 which is the lowest-level heading group in window B may be changed in such a manner that the heading expression for heading group BG2 agrees with the heading expression for heading group AG3 which is the lowest-level heading group in the list. When the indent for a heading group is to be changed, such a change may be applied by shifting the position (x-coordinate) of each heading by an amount equivalent to the indent change. Further, the heading expression for each heading belonging to heading group BG1 which is included in window B and positioned one level higher than heading group BG2 may be changed in such a manner that the heading expression for heading group BG1 agrees with the heading expression for heading group AG2 which is included in the list and positioned one level higher than heading group AG3.

Similarly, the heading expression for each heading belonging to heading group CG1 which is the lowest-level heading group in window C may be changed in such a manner that the heading expression for heading group CG1 agrees with the heading expression for heading group AG3 which is the lowest-level heading group in the list. It is concluded that window D need not be changed because its lower-level heading expressions are preferentially used.

Instead of generating an amendment proposal that represents a screen containing a changed heading expression, the amendment proposal generation section 5 may generate and present information that describes the amendment proposal to be made (describes what change is to be applied to what heading in what screen).

As described above, the second exemplary embodiment permits the evaluator to recognize a heading expression change that is to be applied to solve a consistency problem. In the other respects, the second exemplary embodiment is similar to the first exemplary embodiment.

In the foregoing exemplary embodiments, it is assumed that an expression surrounding radio button items is regarded as a heading expression. However, there may be a case where the expression surrounding radio button items is not regarded as a heading expression. In such a case, it is found that window D has no heading and no heading group. As a result of evaluation, therefore, it is concluded that window D has no consistency problem. In this case, it is found that two different types of heading expressions are used.

The heading group specification section, heading expression judgment section, GUI information recording section, and amendment proposal generation section described in connection with the foregoing exemplary embodiments may be implemented as separate units.

The foregoing exemplary embodiments represent characteristic configurations of the GUI evaluation system as described under (1) to (6) below.

(1) The GUI evaluation system includes a GUI information recording section (which is implemented, for instance, by the GUI information recording storage 101 and the GUI information recording section 4), a heading group specification section (which is implemented, for instance, by the heading group specification means 102 and the heading group specification section 2), and a heading expression evaluation section (which is implemented, for instance, by the heading expression evaluation means 103 and the heading expression judgment section 3). The GUI information recording section stores GUI information that concerns a heading included in an evaluation target screen and includes information indicative of a heading expression which is the expression used for the heading. The heading group specification section groups headings included in each evaluation target screen by expression used for the headings in accordance with the GUI information stored in the GUI information recording section. The heading expression evaluation section evaluates a consistency of heading expressions between a plurality of evaluation target screens by comparing heading groups that are grouped by the heading group specification section and included in all possible combinations of two of the plurality of evaluation target screens.

(2) The heading expression evaluation section in the GUI evaluation system may compare the heading expressions for on-screen heading groups between two evaluation target screens. When any of the heading groups in a screen having a relatively small number of heading groups disagrees with all the heading groups in the other screen, the heading expression evaluation section may conclude that the heading expressions are not consistent.

(3) The GUI information recording section in the GUI evaluation system may store GUI information that concerns heading included in an evaluation target screen and includes information indicative of a heading expression for the heading and information indicative of an on-screen position of the heading. The heading group specification section in the GUI evaluation system may achieve grouping by specifying the headings that are included in the evaluation target screen and agree with each other in the employed expression and in either the vertical or horizontal on-screen position, as members of the same heading group, in accordance with the GUI information stored in the GUI information recording section.

(4) When a heading belonging to a first heading group is positioned within an evaluation target screen and above the leftmost heading belonging to a second heading group, the heading group specification section in the GUI evaluation system may specify the difference between the horizontal position of the leftmost heading belonging to the second heading group and the horizontal position of the heading belonging to the first heading group as an indent for the second heading group. The heading expression evaluation section in the GUI evaluation system may compare the heading expressions and indents for heading groups between two of the plurality of evaluation target screens. When any of the heading groups included in an evaluation target screen having a relatively small number of heading groups disagrees with all the heading groups included in the other evaluation target screen, the heading expression evaluation section may conclude that the heading expressions are not consistent.

(5) The GUI evaluation system may further include an amendment proposal generation section (which is implemented, for instance, by the heading group specification means 102 and the heading group specification section 2). The amendment proposal generation section identifies a hierarchical structure of heading expressions in an evaluation target screen having a largest number of different heading expressions in accordance with heading expression positions in the evaluation target screen, and generates an amendment proposal indicative of heading expression changes in headings included in a screen involving an inconsistency in such a manner that the hierarchical structure of heading expressions in the screen involving an inconsistency agrees with a downwardly traced hierarchical structure or upwardly traced hierarchical structure that is a part of the hierarchical structure of heading expressions in the screen having the largest number of different heading expressions.

(6) The GUI evaluation system includes GUI information recording means (which is implemented, for instance, by the GUI information storage means 101 and the GUI information recording section 4), heading group specification means (which is implemented, for instance, by the heading group specification means 102 and the heading group specification section 2), and heading expression evaluation means (which is implemented, for instance, by the heading expression evaluation means 103 and the heading expression judgment section 3). The GUI information recording means stores GUI information that concerns a heading included in an evaluation target screen and includes information indicative of a heading expression which is the expression used for the heading. The heading group specification means groups headings included in each evaluation target screen by expression used for the headings in accordance with the GUI information stored in the GUI information recording means. The heading expression evaluation means evaluates the consistency of heading expressions between a plurality of evaluation target screens by comparing heading groups that are grouped by the heading group specification means and included in all possible combinations of two of the plurality of evaluation target screens.

While the present invention has been described in terms of preferred exemplary embodiments and examples, it will be understood by those skilled in the art that the invention is not limited to those preferred exemplary embodiments and examples, and that modifications and variations can be made without departing from the spirit and scope of the invention.

INDUSTRIAL APPLICABILITY

The present invention is preferably applicable to the evaluation of the usability of a system.

REFERENCE SIGNS LIST

1 Input/output means
2 Heading group specification section
3 Heading expression judgment section
4 GUI information recording section
5 Amendment generation section
101 GUI information storage means
102 Heading group specification means
103 Heading expression evaluation means
104 Amendment generation means

The invention claimed is:

1. A GUI evaluation system comprising:
a GUI information storage section for storing GUI information that concerns a heading included in an evaluation target screen and includes information indicative of a heading expression which is the expression used for the heading;
a heading group specification section for grouping headings included in each evaluation target screen by expression used for the headings in accordance with the GUI information stored in the GUI information storage section; and
a heading expression evaluation section for evaluating a consistency of heading expressions between a plurality of evaluation target screens by comparing heading groups that are grouped by the heading group specification section and included in all possible combinations of two of the plurality of evaluation target screens.

2. The GUI evaluation system according to claim 1, wherein the heading expression evaluation section compares the heading expressions for on-screen heading groups between two evaluation target screens and, when any of the heading groups in a screen having a relatively small number of heading groups disagrees with all the heading groups in the other screen, concludes that the heading expressions are not consistent.

3. The GUI evaluation system according to claim 1,
wherein the GUI information storage section stores GUI information that concerns heading included in an evaluation target screen and includes information indicative of a heading expression for the heading and information indicative of an on-screen position of the heading; and
the heading group specification section achieves grouping by specifying the headings that are included in the evaluation target screen and agree with each other in the employed expression and in either the vertical or horizontal on-screen position, as members of the same heading group, in accordance with the GUI information stored in the GUI information storage section.

4. The GUI evaluation system according to claim 3,
wherein, when a heading belonging to a first heading group is positioned within an evaluation target screen and above the leftmost heading belonging to a second heading group, the heading group specification section identifies the difference between the horizontal position of the leftmost heading belonging to the second heading group and the horizontal position of the heading belonging to the first heading group as an indent for the second heading group; and
the heading expression evaluation section compares the heading expressions and indents for heading groups between two of the plurality of evaluation target screens and, when any of the heading groups included in an evaluation target screen having a relatively small number of heading groups disagrees with all the heading groups included in the other evaluation target screen, concludes that the heading expressions are not consistent.

5. The GUI evaluation system according to claim 1, further comprising:
an amendment proposal generation section for specifying a hierarchical structure of heading expressions in an evaluation target screen having a largest number of different heading expressions in accordance with heading expression positions in the evaluation target screen, and generating an amendment proposal indicative of heading expression changes in headings included in a screen involving an inconsistency in such a manner that the hierarchical structure of heading expressions in the screen involving an inconsistency agrees with a downwardly traced hierarchical structure or upwardly traced hierarchical structure that is a part of the hierarchical structure of heading expressions in the screen having the largest number of different heading expressions.

6. A GUI evaluation method, implemented by a processor, comprising:
grouping prerecorded headings included in each evaluation target screen by expression used for the headings in accordance with the GUI information including information indicative of a heading expression which is the expression used for the heading; and
evaluating a consistency of the heading expressions between a plurality of evaluation target screens by comparing heading groups that are grouped according to the expressions and included in all possible combinations of two of the plurality of evaluation target screens.

7. The GUI evaluation method according to claim 6, implemented by a processor, further comprising:
comparing the heading expressions for on-screen heading groups between two evaluation target screens and, when any of the heading groups in a screen having a relatively small number of heading groups disagrees with all the heading groups in the other screen, concluding that the heading expressions are not consistent.

8. The GUI evaluation method according to claim 6, implemented by a processor, further comprising:
achieving grouping by specifying headings that are included in an evaluation target screen and agree with each other in the employed expression and in either the vertical or horizontal on-screen position, as members of the same heading group, in accordance with GUI information that concerns the heading included in the evaluation target screen and includes information indicative of a heading expression for the heading and information indicative of an on-screen position of the heading.

9. The GUI evaluation method according to claim 8, implemented by a processor, further comprising:
when a heading belonging to a first heading group is positioned within an evaluation target screen and above a leftmost heading belonging to a second heading group, specifying the difference between the horizontal position of the leftmost heading belonging to the second heading group and the horizontal position of the heading belonging to the first heading group as an indent for the second heading group; and comparing the heading expressions and indents for heading groups between two of the plurality of evaluation target screens and, when any of the heading groups included in an evaluation target screen having a relatively small number of heading groups disagrees with all the heading groups included in the other evaluation target screen, concluding that the heading expressions are not consistent.

10. The GUI evaluation method according to claim 6, implemented by a processor, further comprising:

specifying a hierarchical structure of heading expressions in an evaluation target screen having a largest number of different heading expressions in accordance with heading expression positions in the evaluation target screen; and generating an amendment proposal indicative of heading expression changes in headings included in a screen involving an inconsistency in such a manner that the hierarchical structure of heading expressions in the screen involving an inconsistency agrees with a downwardly traced hierarchical structure or upwardly traced hierarchical structure that is a part of the hierarchical structure of heading expressions in the screen having the largest number of different heading expressions.

11. A non-transitory medium storing a GUI evaluation program, when executed by a processor, performs:

a heading group specification process for grouping prerecorded headings included in each evaluation target screen by expression used for the headings in accordance with the GUI information including information indicative of heading expressions which are the expressions used for the headings; and a heading expression evaluation process for evaluating a consistency of the heading expressions between a plurality of evaluation target screens by comparing heading groups that are grouped by the heading group specification process and included in all possible combinations of two of the plurality of evaluation target screens.

12. The non-transitory computer readable information recording medium according to claim 11, in the heading expression evaluation process, when executed by a processor, performs:

comparing the heading expressions for on-screen heading groups between two evaluation target screens and, if any of the heading groups in a screen having a relatively small number of heading groups disagrees with all the heading groups in the other screen, concluding that the heading expressions are not consistent.

13. The non-transitory computer readable information recording medium according to claim 11, in the heading group specification process, when executed by a processor, performs:

achieving grouping by specifying headings that are included in an evaluation target screen and agree with each other in the employed expression and in either the vertical or horizontal on-screen position, as members of the same heading group, in accordance with GUI information that concerns the heading included in the evaluation target screen and includes information indicative of heading expression for the heading and information indicative of an on-screen position of the heading.

14. The non-transitory computer readable information recording medium according to claim 13, in the heading group specification process, when executed by a processor, performs:

specifying the difference between the horizontal position of the leftmost heading belonging to the second heading group and the horizontal position of the heading belonging to the first heading group as an indent for the second heading group when a heading belonging to a first heading group is positioned within an evaluation target screen and above the leftmost heading belonging to a second heading group; and in the heading expression evaluation process, when executed by a processor, performs:

comparing the heading expressions and indents for heading groups between two of the plurality of evaluation target screens and, when any of the heading groups included in an evaluation target screen having a relatively small number of heading groups disagrees with all the heading groups included in the other evaluation target screen, concluding that the heading expressions are not consistent.

15. The non-transitory computer readable information recording medium according to claim 11, when executed by a processor, performs:

an amendment proposal generation process for specifying the hierarchical structure of heading expressions in an evaluation target screen having the largest number of different heading expressions in accordance with heading expression positions in the evaluation target screen, and generating an amendment proposal indicative of heading expression changes in headings included in a screen involving an inconsistency in such a manner that the hierarchical structure of heading expressions in the screen involving an inconsistency agrees with a downwardly traced hierarchical structure or upwardly traced hierarchical structure that is a part of the hierarchical structure of heading expressions in the screen having the largest number of different heading expressions.

* * * * *